United States Patent [19]

Shearing

[11] 4,094,829

[45] June 13, 1978

[54] QUICK SETTING COMPOSITIONS

[75] Inventor: Herbert Jackson Shearing, Manchester, England

[73] Assignee: Imperial Chemical Industries Limited, London, England

[21] Appl. No.: 710,884

[22] Filed: Aug. 2, 1976

[30] Foreign Application Priority Data

Aug. 29, 1975 United Kingdom ............... 35707/75
Dec. 8, 1975 United Kingdom ............... 50235/75

[51] Int. Cl.$^2$ ....................... C08G 18/38; C08G 18/14
[52] U.S. Cl. ............................ 260/2.5 AK; 260/2.5 A; 260/37 N
[58] Field of Search .................... 260/2.5 AJ, 2.5 AK, 260/2.5 A, 37 N

[56] References Cited

U.S. PATENT DOCUMENTS

| 3,354,099 | 11/1967 | Stegeman | 260/2.5 AK |
|---|---|---|---|
| 3,763,070 | 10/1973 | Shearing | 260/2.5 AK |
| 3,816,307 | 6/1974 | Woods | 260/2.5 AJ |
| 3,826,762 | 7/1974 | Treadwell | 260/2.5 AK |
| 3,865,760 | 2/1975 | Pitts | 260/2.5 AJ |
| 3,931,064 | 1/1976 | Ray | 260/2.5 AK |
| 3,965,051 | 6/1976 | Markusch | 260/37 N |
| 3,975,316 | 8/1976 | Villa | 260/2.5 AK |
| 3,981,831 | 9/1976 | Markusch | 260/2.5 AK |
| 3,983,081 | 9/1976 | Dieterich | 260/2.5 AK |
| 4,042,536 | 8/1977 | Dieterich | 260/37 N |

FOREIGN PATENT DOCUMENTS

| 705,937 | 3/1965 | Canada | 260/2.5 AJ |
|---|---|---|---|
| 2,359,610 | 6/1975 | Germany. | |
| 2,359,612 | 6/1975 | Germany | 260/2.5 AD |
| 1,192,864 | 5/1968 | United Kingdom | 260/2.5 AK |

OTHER PUBLICATIONS

Cotton et al., *Advanced Inorganic Chemistry*; Interscience; London 1962; inside back cover—periodic table.

*Primary Examiner*—C. Warren Ivy
*Attorney, Agent, or Firm*—Cushman, Darby & Cushman

[57] ABSTRACT

A composition obtained by mixing together an aqueous solution or suspension of an ammonium or alkali metal borate and an organic polyisocyanate, and allowing the mixture to set.

13 Claims, No Drawings

QUICK SETTING COMPOSITIONS

This invention relates to quick setting compositions, more particularly to such products derived from borates, and the use thereof.

According to the present invention there is provided a composition which is obtained by mixing together an aqueous solution or suspension of an ammonium or alkali metal borate and an organic polyisocyanate, and allowing the mixture to set.

Examples of ammonium borates which can be used are ammonium biborate and ammonium pentaborate.

Examples of alkali metal borates which can be used are lithium borates, potassium borates, e.g. potassium pentaborate, potassium tetraborate and potassium metaborate, and sodium borates, e.g. anhydrous sodium tetraborate, sodium tetraborate pentahydrate, sodium tetraborate tetrahydrate, sodium metaborate tetrahydrate, sodium metaborate dihydrate and sodium pentaborate pentahydrate. The preferred borate is sodium tetraborate decahydrate (borax) because of its ready availability.

The organic polyisocyanate which is used may be either a simple polyisocyanate or it may be an isocyanate-ended prepolymer obtained by the reaction of excess of an organic polyisocyanate with a polymeric polyol.

As examples of suitable polyisocyanates there may be mentioned aliphatic diisocyanates such as hexamethylene diisocyanate, tetramethylene diisocyanate, 2,2,4- and 2,4,4-trimethyl hexamethylene diisocyanates, aromatic diisocyanates such as tolylene-2,4-diisocyanate, tolylene-2,6-diisocyanate, diphenylmethane-4,4'-diisocyanate, 3-methyldiphenylmethane-4,4'-diisocyanate, m- and p-phenylene diisocyanate, chlorophenylene-2,4-diisocyanate, xylylene diisocyanate, naphthalene-1,5-diisocyanate, diphenyl-4,4'-diisocyanate, 4,4'-diisocyanato-3,3'-dimethyldiphenyl and diphenyl either diisocyanate and cycloaliphatic diisocyanates such as dicyclohexylmethane diisocyanates, methylcyclohexylene diisocyanates and 3-isocyanatomethyl-3,5,5-trimethylcyclohexyl isocyanate. Triisocyanates which may be used include aromatic triisocyanates such as 2,4,6-triisocyanatotoluene and triisocyanatodiphenylether. Examples of other suitable organic polyisocyanates include the reaction products of an excess of a diisocyanate with simple polyhydric alcohols e.g. ethylene glycol, 1,4- 1,3- and 2,3-butanediols, diethylene glycol, dipropylene glycol, pentamethylene glycol, hexamethylene glycol, neopentylene glycol, propylene glycol, glycerol, hexanetriols, trimethylolpropane, pentaerythritol and low molecular weight reaction products of the above polyols with ethylene oxide or propylene oxide.

There may also be used uretedione dimers and isocyanurate polymers of diisocyanates, for example, tolylene-2,4-diisocyanate, tolylene-2,6-diisocyanate and mixtures thereof, and the biuret polyisocyanates obtained by the reaction of polyisocyanates with water.

Mixtures of polyisocyanates may be used, including the mixtures obtained by the phosgenation of the mixed polyamines prepared by the reaction of formaldehyde with aromatic amines e.g. aniline and orthotoluidine under acidic conditions. An example of the latter polyisocyanate mixture is that known as crude MDI, prepared by the reaction of formaldehyde with aniline in the presence of hydrochloric acid and which consists of diphenylmethane-4,4'-diisocyanate in admixture with isomers thereof and with methylene linked polyphenyl polyisocyanates containing more than two isocyanate groups.

A further polyisocyanate-containing material which may be used is the distillation residue obtained by distillation of substantially all of the volatile diisocyanate from a crude tolylene diisocyanate prepared by phosgenation of a tolylene diamine.

Isocyanate-ended prepolymers which may be used in the preparation of compositions according to the present invention are obtained by reaction of an excess of any of the organic polyisocyanates defined above with a polymeric polyol, e.g. a hydroxyl-ended polyester, polyesteramide, polyether, polyetherthioether, polyacetal or polyolefin.

Examples of hydroxyl-terminated polyesters and polyesteramides suitable for use in the preparation of prepolymers are those obtained by known methods from carboxylic acids, glycols and as necessary, minor proportions of diamines or aminoalcohols. Suitable dicarboxylic acids include succinic, glutaric, adipic, suberic, azelaic, sebacic, phthalic, isophthalic and terephthalic acids and mixtures of these. Examples of dihydric alcohols include ethylene glycol, 1,2-propylene glycol, 1,3-butylene glycol, 2,3-butyleneglycol, diethylene glycol, tetramethylene glycol, pentamethylene glycol, hexamethylene glycol, decamethylene glycol and 2,2-dimethyltrimethylene glycol. Suitable diamines or amino-alcohols include hexamethylene diamine, ethylene diamine, mono-ethanolamine and phenylenediamines. Mixtures of polyesters and polyesteramides may be used if desired. Small proportions of polyhydric alcohols such as glycerol or trimethylolpropane may also be used, in which case branched polyesters and polyesteramides are obtained.

As examples of hydroxyl terminated polyethers which may be reacted with an excess of an organic polyisocyanate as defined above to form a prepolymer there may be mentioned polymers and copolymers of cyclic oxides, for example 1,2-alkylene oxides e.g. ethylene oxide, epichlorohydrin, 1,2-propylene oxide and 1,2-butylene oxide, 2,3-butylene oxide, oxycyclobutane and substituted oxycyclobutanes and tetrahydrofuran. There may also be mentioned polyethers obtained by the polymerisation of an alkylene oxide in the presence of a basic catalyst and water, glycol or a primary monoamine. Mixtures of such polyethers may be used.

As examples of polyetherthioethers suitable for use in the preparation of prepolymers there may be mentioned the products of the self-condensation of thioglycols, e.g. thiodiglycol, or of the condensation of thioglycols with glycols.

As examples of polyacetals suitable for use in the preparation of prepolymers there may be mentioned the reaction products of aldehydes, e.g. formaldehyde, acetaldehyde and butyraldehyde, with dihydric alcohols, e.g. propylene glycol, butylene glycols and diethylene glycol.

As examples of hydroxyl-terminated polyolefins suitable for use in the preparation of prepolymers there may be mentioned the products obtained by oxidative degradation of polyolefins of higher molecular weight. Typically, polymers of butadiene or of its copolymers with other monomers, e.g. styrene or acrylonitrile, may be oxidised to produce a lower molecular weight product having terminal isocyanate-reactive groups. Residual ethylenic unsaturation may be removed by hydrogenation. Alternatively, the olefin monomer may be polymerised or copolymerised by (i) a free radical mechanism or by (ii) an anionic mechanism. Typically in the case of (i) the olefinic monomer is polymerised in the presence of initiators and optionally chain transfer agents both of which bear two isocyanate reactive groups or groups which are readily converted into isocyanate-reactive groups. In the case of (ii), typically the monomer is polymerised using as initiator a compound which provides a difunctional polymer, the terminal functionalities of which are readily convertible into isocyanate-reactive groups by methods well known in the art.

Other prepolymers which may be used in the process of the present invention are those obtained by reacting a coal tar pitch which contains isocyanate-reactive groups with an excess of an organic polyisocyanate, for example, one or more of the organic polyisocyanates defined above, optionally together with an organic compound containing isocyanate-reactive groups e.g. the polyesters, polyesteramides, polyethers and other hydroxyl-terminated polymers defined above. Coal tar pitch-based prepolymers of this kind are described in our UK Specification No. 1,093,375.

The organic polyisocyanates and isocyanate-terminated polyurethane prepolymers prepared as described above are generally stable at normal temperatures in the absence of moisture. When present as part of a mixture as defined above, which also contains an aqueous solution or suspension of an ammonium or alkali-metal borate, the free isocyanate groups will react with the water present to form a polymer which acts as a binder.

The relative proportions of the borate and the organic polyisocyanate in the mixture may vary widely, and useful products are obtained at a borate/polyisocyanate ratio from 1 : 0.5 to 1 : 50 by weight.

The compositions are prepared simply by mixing the aqueous solution or suspension of the borate compound with the organic polyisocyanate until the mixture is essentially homogeneous, the amount of water being such that a spreadable paste or fluid mix is obtained.

oil and non-drying oil modified alkyd resins, castor oil, hydrogenated castor oil, urethane oils, which are the reaction products of diisocyanates with the alcoholysis products of a drying oil, for example, mono- or diglycerides from linseed oil, and urethane alkyds, which are alkyd resins in the manufacture of which a part of the phthalic anhydride has been replaced by a diisocyanate. A further and particularly useful material which may be used as the isocyanate-reactive organic compound is that obtained by the high temperature reaction of castor oil with a complex resin obtained by reacting together natural rosin, glycerol and a resol resin at a high temperature. The castor oil and complex resin may be reacted in the proportions from 95:5 to 20:80 parts by weight, at a temperature from 230° to 250° C for a time of from ½ to 2 hours. Typically, castor oil and the complex resin in the proportion of 4:1 by weight are heated together at a temperature of approximately 240° C for about 45 minutes. To prepare the complex resin, natural rosin (colophony), glycerol and the resol (prepared by the condensation of 1 mole of diphenylolpropane with approximately 4 moles of formaldehyde under aqueous alkaline conditions at moderate temperatures) in the proportions of about 8.2:1.1:1.0 by weight are heated at a temperature of up to 275° C in an inert atmosphere until the acid value is less than 20 mg KOH/g.

In addition to, or in place of, the polyfunctional isocyanate-reactive organic compound, there may be used a monofunctional organic isocyanate-reactive compound, which is preferably a monohydric alcohol but may also be a monocarboxylic acid and, less preferably, a monoamine. Examples of monohydric alcohols are methanol, ethanol, n-propanol, isopropanol, the isomeric butanols, hexanol, iso-octanol, nonanol, decanol, dodecanol, cetanol, unsaturated alcohols such as allyl, oleyl and propargyl alcohols and the polyether alcohols obtained by the interaction of alkylene oxides, for example, ethylene oxide and/or propylene oxide, with monohydric alcohols. There may also be used the monohydric diepoxy alcohol having the formula:

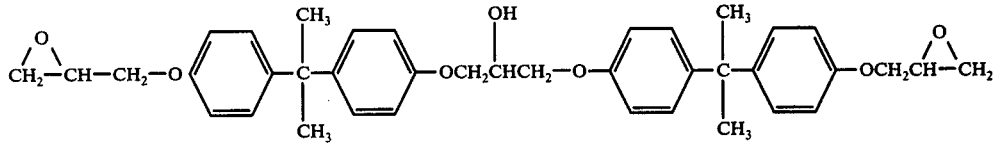

The mixture sets up quite rapidly and, according to the choice of reactants, can remain workable for times up to 20 or 30 minutes.

According to a further, and preferred, feature of the invention, the mixture may also contain an organic polyfunctional isocyanate-reactive compound which may be any of those hydroxyl-terminated polymers already disclosed above as being suitable for the preparation of isocyanate-terminated prepolymers. Other polyfunctional isocyanate-reactive organic compounds which may be used include the simple polyhydric alcohols containing from 2 to 6 carbon atoms and from 2 to 4 hydroxyl groups and the low molecular weight reaction products thereof with ethylene oxide or propylene oxide; also aminoalcohols e.g. monoethanolamine, polyamines, e.g. ethylene diamine, hexamethylene diamine, m- and p-phenylene diamines and 2,4- and 2,6-diaminotoluenes, epoxy resins which also contain isocyanate-reactive groups, for example, the hydroxyl group-containing products obtained by reaction between diphenylolpropane and epichlorohydrin, drying Examples of suitable monocarboxylic acids are saturated monocarboxylic acids of the normal fatty acid series which contain from 2 to 18 carbon atoms, including the mixed fatty acids derived from the saponification of natural glycerides, and unsaturated fatty acids, for example, elaeostearic, linolenic, linoleic and oleic acids.

Mixtures of different monofunctional and polyfunctional organic isocyanate-reactive compounds, and of monofunctional with polyfunctional compounds, may be used.

Aqueous solutions or suspensions of ammonium or alkali metal borates act as excellent emulsifying agents for the organic polyisocyanate and, if used, the organic isocyanate-reactive organic compound, as hereinbefore described. Accordingly, it is usually only necessary to stir these organic components into the aqueous borate to ensure their satisfactory dispersion.

The amount of isocyanate-reactive compound which is used is preferably up to that which is theoretically necessary to react completely with all of the isocyanate groups in the organic polyisocyanate. In practice, this amount may effectively be an excess, since some of the polyisocyanate is used up by reaction with the aqueous borate. A moderate excess, of up to 25% by weight, of isocyanate-reactive compound over the theoretical amount for reaction with the polyisocyanate may be used, but large excesses are not desirable as the properties of the cured composition may be adversely affected.

United Kingdom Patent Specification No. 1186771 describes and claims a process for the production of silicious products which comprises reacting an aqueous solution of an alkali metal silicate with an organic isocyanate or isothiocyanate.

It has now been found that partial replacement of the alkali metal silicate in these known products by an ammonium or alkali metal borate gives compositions which have the advantage that they set much less rapidly than the all-silicate products. The rate of setting decreases progressively as the proportion of borate to silicate increases.

Thus the present invention also comprises compositions as hereinbefore defined in which up to 90% by weight of the ammonium or alkali metal borate, based on the anhydrous compound, is replaced by an ammonium or alkali metal silicate.

The alkali metal silicate which is used may be lithium silicate or potassium silicate but is preferably sodium silicate, which is a cheap, readily available product, conveniently obtainable in the form of an aqueous solution known as "water-glass", containing 40% or more of sodium silicate. The sodium silicate in water glass has a molar ratio $SiO_2/Na_2O$ of approximately 3.3:1.0, but any water-soluble sodium silicate having the molar ratio $SiO_2/Na_2O$ from 1.65 to 3.86:1.0 can be conveniently used.

Our copending United Kingdom Patent Application No. 33044/75 describes compositions which are obtained by mixing an aqueous solution of an alkali metal or ammonium silicate with at least one non-silicate compound of a polyvalent metal having a solubility in water at 20° C of at least 0.01 grams per liter, in amount at least equal to that required for the formation of an insoluble metal silicate with all of the silicate ions present, in the presence of (1) an organic polyisocyanate or (2) an organic polyisocyanate and a polyfunctional organic isocyanate-reactive compound, and allowing the mixture to set.

It has now been found that the ammonium or alkali metal silicate in the above-mentioned compositions can be partially or wholly replaced by an ammonium or alkali metal borate to give compositions which have similar properties but which set more slowly, Again, the rate of setting decreases progressively as the proportion of borate to silicate increases and reaches a minimum when no silicate is present. Furthermore, the non-silicate polyvalent metal compound may be partially or wholly replaced by a hydraulic cement. Thus according to a yet further feature of the present invention there is provided a composition as hereinbefore described which also contains at least one compound of a polyvalent metal in amount from 5% to 100 times that theoretically necessary to react completely with the ammonium or alkali metal borate, or borate and silicate together, and/or a hydraulic cement.

Preferred proportions of the polyvalent metal compound when used above, i.e. in the absence of hydraulic cement are from 10 to 8000% of the amount theoretically necessary for complete reaction with the borate/silicate.

The non-silicate polyvalent metal compound may be any compound of a metal selected from Groups IB to VIII inclusive of the Periodic Table (as set out on the inside back voer of the book 'Advanced Inorganic Chemistry' by Cotton and Wilkinson, 2nd Edition, published 1966 by Interscience Publishers) which is capable of forming an essentially water-insoluble borate or silicate and which compound itself has a solubility in water at 20° C of at least 0.01 grams per liter. Polyvalent metal compounds which can be used include compounds of copper, magnesium, calcium, strontium, barium, zinc, cadmium, mercury, aluminium, titanium, tin, lead, chromium, manganese, iron, cobalt and nickel. Mixtures of polyvalent metal compounds can be used.

Specific polyvalent metal compounds which can be used include copper (II) chloride, copper (II) sulphate, copper (II) nitrate, copper (II) acetate, copper (II) carbonate, copper (II) hydroxide, magnesium sulphate, magnesium chloride, magnesium carbonate, magnesium hydroxide, calcium chloride, calcium sulphate (hydrated), calcium hydroxide, calcium carbonate, strontium chloride, barium chloride, barium hydroxide, zinc chloride, zinc sulphate, zinc chromate, zinc acetate, zinc carbonate, zinc oxide, zinc hydroxide, cadmium sulphate, mercury (II) chloride, aluminium sulphate, aluminium hydroxide, tin (II) chloride, lead (II) chloride, lead (II) nitrate, chromium (III) sulphate, manganese (II) chloride, iron (II) chloride, iron (II) sulphate, iron (III) chloride, iron (III) oxide, iron (III) hydroxide, cobalt (II) chloride, cobalt (II) sulphate, nickel (II) chloride, nickel (II) nitrate and nickel (II) sulphate.

For economic reasons it is preferred to use polyvalent metal compounds which are readily available and cheap for example, calcium hydroxide, which has the additional advantage that its compounds with colourless anions are themselves colourless or white.

The polyvalent metal compound is preferably employed in the form of an aqueous solution, or where the solubility of the compound in water is too low to permit the employment of the desired amount in solution form, as an aqueous slurry or suspension.

It is essential that the polyvalent metal compound has sufficient solubility in water to allow it to undergo chemical interaction with the ammonium or alkali metal borate/silicate solution or suspension. Compounds having very low aqueous solubility, for example, barium sulphate and titanium dioxide, cannot be used. When an aqueous slurry or suspension of the polyvalent metal compound is employed, the compound should be in very finely divided form, preferably having a particle size not greater than 75 microns.

The hydraulic cement which may be used comprises any member or members of that class of structural materials which are applied in admixture with water and which thereafter harden or set as a result of physical and/or chemical changes which consume at least part the water present. In addition to Portland cement, other hydraulic cements which may be used include:

1. Rapid hardening cements, as characterised by those having high alumina contents.
2. Low-heat cements as characterised by high percentages of dicalcium silicate and tetracalcium aluminoferrite and low percentages of tricalcium silicate and tricalcium aluminate.

3. Sulphate-resisting cements as characterised by unusually high percentages of tricalcium silicate and dicalcium silicate and unusually low percentages of tricalcium aluminate and tetracalcium aluminoferrite.

4. Portland blast-furnace cement as characterised by a mixture of Portland cement clinker and granulated slag.

5. Cements as normally used in masonry work and characterised by mixture of Portland cement and one or more of the following: hydrated lime, pulverised limestone, colloidal clay, diatomaceous earth or other finely divided forms of silica.

6. Natural cements as characterised by material obtained from deposits in the Lehigh Valley, USA.

7. Lime cements as characterised by oxide of calcium in its pure or impure forms and whether containing or not some argillaceous material.

8. Selenitic cement as characterised by the addition of 5–10% of plaster of Paris to lime.

9. Pozzolanic cement as characterised by the mixture of pozzolana, trass, kieselguhr, pumice, tufa, santorin earth or granulated slag with lime mortar.

10. Calcium sulphate cements as characterised by those depending upon the hydration of calcium sulphate and includes plaster of Paris, Keen's cement and Parian cement.

11. Waterproofed cements as characterised by mixtures of Portland cement with calcium stearate or paraffin.

The preferred hydraulic cement is Portland cement, including white Portland cement which is a special grade having a low iron oxide content.

The non-silicate compound of a polyvalent metal and the hydraulic cement can each be used alone, in the absence of the other, or they can be used in admixture, in any desired proportions.

When making up compositions containing a polyvalent metal compound and/or hydraulic cement according to the present invention the organic polyisocyanate and, if used, the organic isocyanate-reactive compound must be mixed with the ammonium or alkali metal borate/silicate solution or suspension before adding the polyvalent metal compound and/or hydraulic cement, or alternatively the organic components must be mixed with the polyvalent metal compound and/or hydraulic cement, before adding the aqueous borate/silicate. Satisfactory results cannot be achieved if the aqueous borate/silicate solution or suspension is mixed with the polyvalent metal compound and/or hydraulic cement before adding the organic components. Interaction between the borate/silicate and the polyvalent metal compound and/or hydraulic cement is usually so rapid that the organic components cannot subsequently be mixed in. It is therefore essential that the borate/silicate solution of suspension and the polyvalent metal compound and/or hydraulic cement be mixed in the presence of the organic polyisocyanate and organic isocyanate-reactive compound. Portland cement and other hydraulic cements as hereinbefore defined also undergo chemical interaction with ammonium and alkali metal silicate/borate solutions/suspensions, leading to rapid setting of the mixtures. The reactions involved, particularly with Portland cement and other cements containing Portland cement, are imperfectly understood, so that expression of the amount of such hydraulic cement which may be used, in terms of a theoretical reaction requirement, is not generally possible. However, in general terms the amount of hydraulic cement, when used in the absence of any non-silicate polyvalent metal compound as hereinbefore defined, may be from 1% to 40% by weight of the total weight of the composition.

When a non-silicate polyvalent metal compound and a hydraulic cement are used together, it is a simple matter for a person skilled in the art to select proportions of these two components to give a composition having the desired setting characteristics.

The amount of water in the compositions, including that which is present in the ammonium or alkali-metal borate solution or suspension (and silicate solution when present) must be sufficient to ensure that, after mixing, the composition remains workable to enable adequate use before setting. It will be understood that this amount will vary considerably according to the relative amounts of borate, polyvalent metal compound and/or hydraulic cement, and organic component which are used, and will also depend upon the nature of the latter two components. However, in general the amount of water used may be from 5 to 200% of the total weight of borate (and silicate when present), polyvalent metal compound and/or hydraulic cement, and organic components taken together.

The organic polyisocyanate and, if used, the organic isocyanate-reactive compound must be present in the composition in an amount to ensure that, after setting, the composition remains coherent and has some resistance to mechanical shock, i.e. is not friable or excessively brittle. The amount necessary will evidently depend to some extent upon the nature of the organic components which are used, but quantities in the range from 10 to 800% of the weight of ammonium or alkali-metal borate (and silicate when present) and polyvalent metal compound and/or hydraulic cement taken together are generally satisfactory.

In addition to the essential and optional constituents of the compositions according to the present invention which have already been described, the compositions may also contain inert fillers, for example, power station fly ash, expanded clay, foamed slag, mica, talc, clays (e.g. china clay), asbestine, barytes, silica, powdered slate and vermiculite. These fillers may be used from a minimum of 1% of the total weight of the essential dry ingredients. Fibrous fillers, e.g. rock wool, glass fibre and asbestos may also be used as reinforcing materials.

Inert plasticisers, for example, butyl benzyl phthalate, dioctyl phthalate or dinonyl phthalate may be added to the compositions to modify their rheological properties before setting.

Inert solvents, for example, esters, ketones, hydrocarbons and halogenated hydrocarbons may also be employed to assist with the incorporation of very viscous or other difficulty compatible materials into the compositions, but the use of volatile or flammable solvents is best avoided because of the environmental hazards which they present.

Dyestuffs and pigments may also be added if the compositions are required for decorative purposes or where a decorative effect is desirable.

The compositions prepared according to the present invention, before setting, can be spread over surfaces, for example, floors, ceilings, walls and inclined or curved surfaced by trowelling, brushing, spraying or by squeegee, and can be cast, moulded or extruded into any desired shape, e.g. slabs, blocks, or open half-cylinders of the kind which are widely used for insulating pipework.

When the compositions are to be used for insulation purposes, the organic components which are used in their formulation should be selected according to the maximum operating temperature to which the polymer resulting from their reaction will be subjected. Thus, the resulting polymer should have a softening point well above the maximum operating temperatures. Because of the high inorganic content of such compositions they are very resistant to combustion and present minimal fire hazard.

The compositions may also be obtained in foamed form by incorporating into the mixture of ingredients a blowing agent of the kind known from the art as being suitable for the production of polyurethane foams, and/or by reducing the overall basic nature of the mixture so that there is insufficient alkalinity to absorb all of the carbon dioxide which is formed by reaction of the organic polyisocyanate with the water. Foam stabilising agents may also be used if necessary.

The invention is illustrated but not limited by the following examples in which all parts and percentages are by weight.

EXAMPLE 1

The following compositions were made up, the ingredients being mixed in the order shown:

|  | 1 | 2 | 3 | 4 | 5 | 6 | 7 |
|---|---|---|---|---|---|---|---|
| Borax | 5 | 4 | 3 | 2 | 1 | 0.5 | — |
| Water | 7 | 6 | 5 | 4 | 3 | 2 | — |
| Castor oil | 10 | 10 | 10 | 10 | 10 | 10 | 10 |
| Crude MDI | 10 | 10 | 10 | 10 | 10 | 10 | 10 |
| 40% aqueous solution of sodium silicate | — | 2 | 4 | 6 | 8 | 10 | 12 |
| Working life (approximate time in minutes) | 20 | 15 | 15 | 12 | 10 | 5 | 2½ |

Mix No. 7 is a comparative composition.

The working life is taken as the time at which the mix loses flow properties and signs of gelation and setting are noted.

EXAMPLE 2

The following compositions were made up:

|  | 1 | 2 | 3 |
|---|---|---|---|
| Borax | 4 | 4 | — |
| Water | 6 | 6 | 2 |
| Castor oil | 10 | 10 |  |
| Hydrated lime | 2 | 2 | 2 |
| Crude MDI | 10 | 10 | 10 |
| 40% aqueous solution of sodium silicate | — | 2 | 12 |
| Working life (approximate time in mins.) | 10 | 8 | 2½ |

Mix No. 3 is a comparative composition.

EXAMPLE 3

The compositions 1, 2 and 3 described in Example 2 were repeated with the difference that the 2 parts of hydrated lime were in each case replaced by 3 parts of Portland cement. Similar compositions having similar working times were obtained.

Mix No. 3 is a comparative composition.

We claim:

1. A composition obtained by first preparing a reaction mixture by mixing together an aqueous solution or suspension of an ammonium or alkali metal borate and an organic polyisocyanate in amount such that the borate/polyisocyanate ratio is from 1:0.5 to 1:50 by weight, the amount of water supplied by said aqueous solution or suspension being sufficient to render the total reaction mixture a spreadable paste or fluid mix, and allowing said reaction mixture to set.

2. A composition as claimed in claim 1 wherein the borate is sodium tetraborate decahydrate.

3. A composition as claimed in claim 1 wherein said mix also contains an organic polyfunctional isocyanate-reactive compound and/or a monofunctional isocyanate-reactive compound in amount up to that which is theoretically necessary to react completely with all of the isocyanate groups in the organic polyisocyanate discounting any reaction between said isocyanate groups and water present.

4. A composition as claimed in claim 1 wherein up to 90% by weight of the ammonium or alkali metal borate based on the anhydrous compound is replaced by an ammonium or alkali metal silicate.

5. A composition obtained by mixing an aqueous solution of an alkali metal or ammonium borate and an alkali metal or ammonium silicate, with (a) at least one non-silicate compound of a polyvalent metal having a solubility in water at 20° C of at least 0.01 gm per liter and/or (b) a hydraulic cement, in amount from 5% to 100 times that theoretically necessary to react completely with the alkali metal or ammonium borate, or borate and silicate together, to form an insoluble metal borate and/or silicate in the presence of (1) an organic polyisocyanate or (2) an organic polyisocyanate and a mono and/or a polyfunctional organic isocyanate-reactive compound present in an amount up to that which is theoretically necessary to react completely with all the isocyanate groups in the organic polyisocyanate, and allowing the mixture to set.

6. A composition as claimed in claim 5 wherein the polyvalent metal compound is employed in the form of an aqueous solution, or an aqueous slurry or suspension.

7. A composition as claimed in claim 5 wherein when an aqueous suspension or slurry is employed the polyvalent metal compound has a particle size not greater than 75 microns.

8. A composition as claimed in claim 5 wherein the quantity of the polyvalent metal compound used in the absence of hydraulic cement is from 10 to 8000% of the amount required for reaction with all of the borate and/or silicate ions present.

9. A composition as claimed in claim 5 wherein the amount of water used is from 5 to 200% of the total weight of borate, and silicate when present, polyvalent metal compound and/or hydraulic cement and organic components taken together.

10. A composition as claimed in claim 5 wherein the combined quantity of organic polyisocyanate and, if used, the organic isocyanate-reactive compound is in the range from 10 to 800% of the weight of alkali metal or ammonium borate, and silicate when present, and polyvalent metal compound and/or hydraulic cement taken together.

11. A composition as claimed in claim 5 wherein an inert filler is used from a minimum of 1% of the total weight of dry ingredients.

12. A composition as claimed in claim 5 wherein an inert plasticiser is added to the composition to modify its rheological properties before setting.

13. A composition as claimed in claim 5 wherein the composition is obtained in foamed form by incorporating into the mixture of ingredients a blowing agent.

* * * * *